(12) United States Patent
de Melo Dahia et al.

(10) Patent No.: US 12,718,621 B2
(45) Date of Patent: Aug. 25, 2026

(54) SIGN LANGUAGE RECOGNITION USING PARAMETER KEYPOINTS

(71) Applicant: Lenovo (Singapore) Pte. Ltd., Singapore (SG)

(72) Inventors: Marcio Leal de Melo Dahia, Recife (BR); Silvan Ferreira da Silva Junior, Caraúbas (BR); Igor Victor Lucena do Nascimento, Recife (BR); Edward Roe, Recife (BR); Esdras Souto Costa, Paulista (BR); Alberto Chaves Rezende Neto, Recife (BR); Jampierre Vieira Rocha, Itambacuri (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 264 days.

(21) Appl. No.: 18/453,891

(22) Filed: Aug. 22, 2023

(65) Prior Publication Data

US 2025/0069443 A1 Feb. 27, 2025

(51) Int. Cl.
*G06V 40/20* (2022.01)

(52) U.S. Cl.
CPC .................................... *G06V 40/28* (2022.01)

(58) Field of Classification Search
CPC ...................................................... G06V 40/28
See application file for complete search history.

(56) References Cited

U.S. PATENT DOCUMENTS 10,037,458 B1 7/2018 Mahmoud et al.
10,757,251 B1 * 8/2020 Matula .................... G06F 40/58
2018/0075659 A1 * 3/2018 Browy .............. G02B 27/0172
2019/0251702 A1 * 8/2019 Chandler .................. G06T 7/20
2021/0174519 A1 * 6/2021 Bazarevsky .............. G06T 7/75
2021/0397266 A1 * 12/2021 Gupta .................... G06N 20/10
2021/0397826 A1 * 12/2021 Sun ........................ G06N 3/042
2022/0327961 A1 * 10/2022 Kelly ..................... G09B 21/04
2022/0383025 A1 * 12/2022 Beller .................. G06V 40/113
2023/0085161 A1 * 3/2023 Rahmani .............. G09B 21/009 704/235
2023/0290371 A1 * 9/2023 Jawahar .................. G10L 25/30
2023/0343011 A1 * 10/2023 Kelly .................... G06T 13/205
2025/0069443 A1 * 2/2025 de Melo Dahia ...... G06V 40/28

FOREIGN PATENT DOCUMENTS

CN 111325099 B 8/2022

* cited by examiner

*Primary Examiner* — Ming Y Hon
(74) *Attorney, Agent, or Firm* — Schwegman Lundberg & Woessner, P.A.

(57) ABSTRACT

A system captures image data that includes a person executing a sign of a sign language. Keypoints are extracted from the image data. The keypoints include locations on a hand of the person, an arm of the person, a trunk of the person and a face of the person. The keypoints are provided to a parameter analyzer for detecting characteristics of the sign. The characteristics of the sign includes a handshape, a palm orientation, an articulation point and a movement. A description of the sign is generated from an output of the parameter analyzer. The description of the sign is filtered and aggregated, thereby creating a condensed description of the sign. A database of known signs is queried with the condensed description using a dynamic time warping algorithm. A word is retrieved from the database that is associated with the sign.

18 Claims, 9 Drawing Sheets

SIGN LANGUAGE RECOGNITION USING PARAMETER KEYPOINTS

TECHNICAL FIELD

Embodiments described herein generally relate to the recognition of signs in a sign language, and in an embodiment, but not by way of limitation, the recognition of signs in a sign language using parameter keypoints.

BACKGROUND

Sign languages, which are also known as signed languages, are languages that use a visual-manual modality to convey meaning instead of spoken words. Sign languages are expressed through manual articulation in combination with non-manual markers. Sign languages are full-fledged natural languages with their own grammar and lexicon. Sign languages are not universal and are usually not mutually intelligible, although there are similarities among different sign languages. Although signing is used primarily by the deaf and hard of hearing, it is also used by hearing individuals, such as those who are unable to physically speak, those who have trouble with oral language due to a disability or condition, and those with deaf family members.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In an embodiment, an image sensing device such as a video camera senses and captures video image data of a person executing a sign or signal from a sign language. From each frame of the video data, points, or more particularly keypoints, of the person's hands, arms, trunk, and face are extracted. The keypoints are used as input into a parameter analyzer for each of determining a handshape, a palm orientation, an articulation point, and a movement, which can be referred to as the subunits of the sign. Each parameter analyzer detects a specific characteristic of the sign of the sign language.

Each parameter analyzer can be an independent process and can be composed of several parts. A parameter analyzer can include a classifier that interprets the content of a given frame of video data and that defines the exact value that a parameter assumes in the context of that video frame. A parameter analyzer can include a comparison metric, that is, a comparison between any two combination instances the given parameters can assume. A parameter analyzer can include a window and step function, which determines the time resolution of the classification of the parameter. Finally, a parameter analyzer can include a weight function, which is a determination of the contribution of the given parameter to the classification of the sign as a whole. The window and step function and the weight function can be calculated empirically, and they are utilized in a matching phase, that is, the matching of the sign in the video data with signs in the database.

The combination of the output of each parameter analyzer represents a description of the sign that is to be identified. The description is used to query a database, which can be referred to as a RALSpository, wherein the database includes a library of descriptions of the known signs of the particular sign language. Then, using a two-step process that can be referred to as a "Time Warping Matcher", the word that is represented by the sign is returned.

Figure 1:
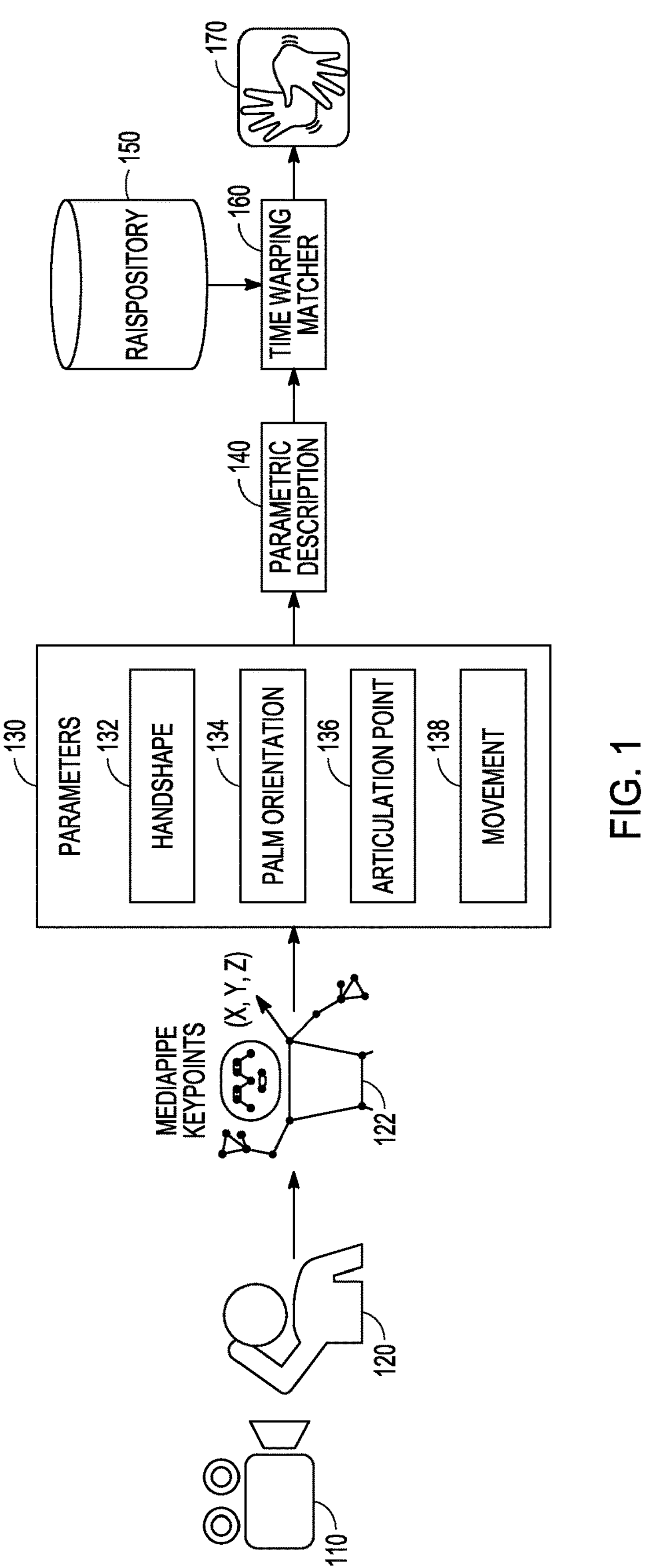
FIG. 1 is a high-level block diagram of a system to recognize a sign from a sign language using parameter keypoints.

FIG. 1 is a high-level block diagram of a system to recognize a sign from a sign language using parameter keypoints. In FIG. 1, a video camera 110 captures video data of a person 120 executing a sign of a sign language. At 122, keypoints are captured from the hands, arms, torso and face of the person. In an embodiment, the MediaPipe application (from Google's holistic library; but any other model that extracts body keypoints can be used) can be used to capture the keypoints. The output is a data structure that holds the coordinates (x, y, z) of each keypoint. As indicated at 130, the parameters or keypoints are used to determine the handshape 132, the palm orientation 134, the articulation point 136 and the movement 138. Specifically, as disclosed in further detail below, these parameters are used to generate a parameter description. As indicated at 140, these parameter descriptions are simply decimal numbers that represent the characteristics of the parameters. These parameter descriptions are input into a time warping matcher 160, whose function is described in more detail below, and along with input from the data from the database 150, the time warping matcher 160 determines/matches the sign 170 from the user with a sign and associated word from the database. The database 150 includes a data structure that includes parameter values (or descriptions) for the handshape, palm orientation, articulation point and movement of known signs.

As noted above, the architecture of the system includes the four parameters (or subunits) and their associated parameter analyzers relating to handshape, palm orientation, articulation point and movement. Each of these parameters is built independently using the keypoints that are extracted from the input video data.

Figure 2:
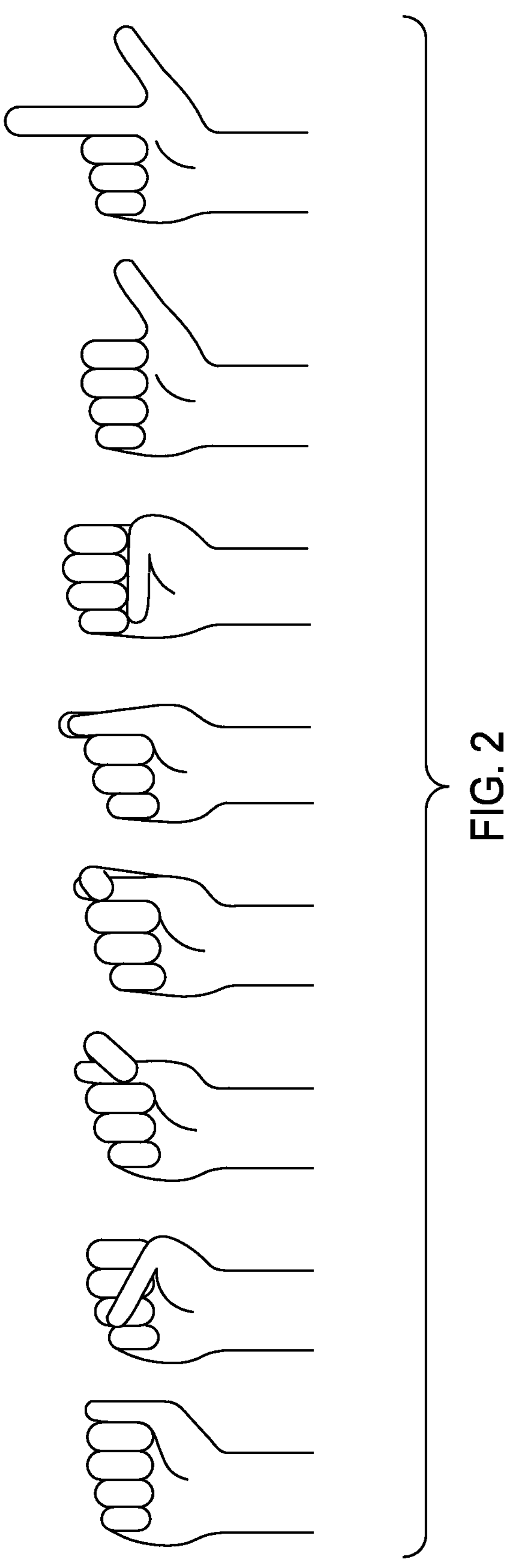
FIG. 2 illustrates examples of signs and handshapes of signs.

The first parameter, the handshape parameter, refers to the configurations that the hands can assume during the execution of a sign. FIG. 2 illustrates a few examples of signs and handshapes of signs, but of course there are many more in the alphabet and/or vocabulary of any particular sign language. In an embodiment, the recognition of a handshape is done using an artificial neural network (ANN or other trained machine learning algorithm) that recognizes all the different handshapes of a sign language. In an embodiment, it is a one-layer ANN that is fully connected. Specifically, the ANN is trained to recognize the known signs of a sign language by capturing keypoint data of those signs. The captured keypoint data from a person who executes a sign are then provided to the trained ANN, and the ANN determines the handshape of the sign provided by the person.

To classify a given handshape from a specific frame of the input video data, the handshape parameter descriptor receives the hand keypoints, and it normalizes its coordinates inside a bounding box. A comparison metric consists of comparing the distance between two handshapes, thereby defining the metric, wherein each handshape is described as a list of five integers, each one referring to the configuration of each finger in relation to a finger next to it (0 to 5, 0 being closed and 5 being spread).

Figure 3:
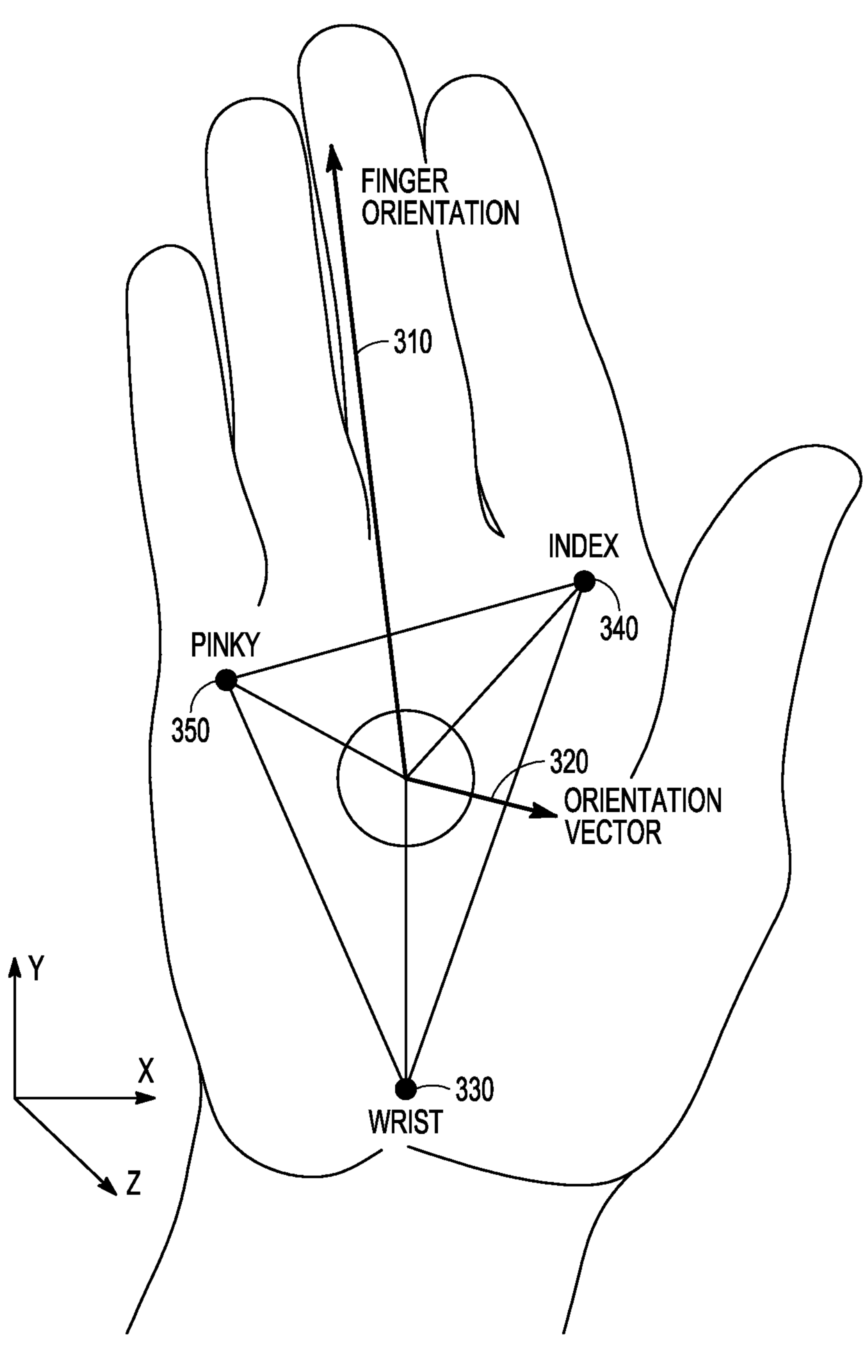
FIG. 3 illustrates a parallel vector and a perpendicular vector that are used to determine a palm orientation of a sign from a sign language.

FIG. 3 illustrates a determination of a palm orientation parameter or subunit of a sign from a sign language using a perpendicular vector 320 and a parallel vector 310. The perpendicular vector 320 is perpendicular to the palm of the hand and the parallel vector 310 is parallel to the palm of the hand and extends towards the fingers. These two vectors are calculated algebraically using three points of the hand that form a triangle or plane. These points, which are provided by MediaPipe for example, are a wrist point 330, an index finger point 340 at the base of the index finger, and a pinky finger point 350 at the base of the pinky finger. The algebraically calculated perpendicular vector 320 and palm vector 310 are illustrated in FIG. 3. Determining the palm and finger vectors algebraically has an advantage of being intuitive and easy to calculate. For the palm orientation, the comparison metric is the sum of the dot product of the palm and finger vectors of the data from a sign input by a person compared with the dot products of the palm and finger vectors of the signs stored in a database.

Figure 4:
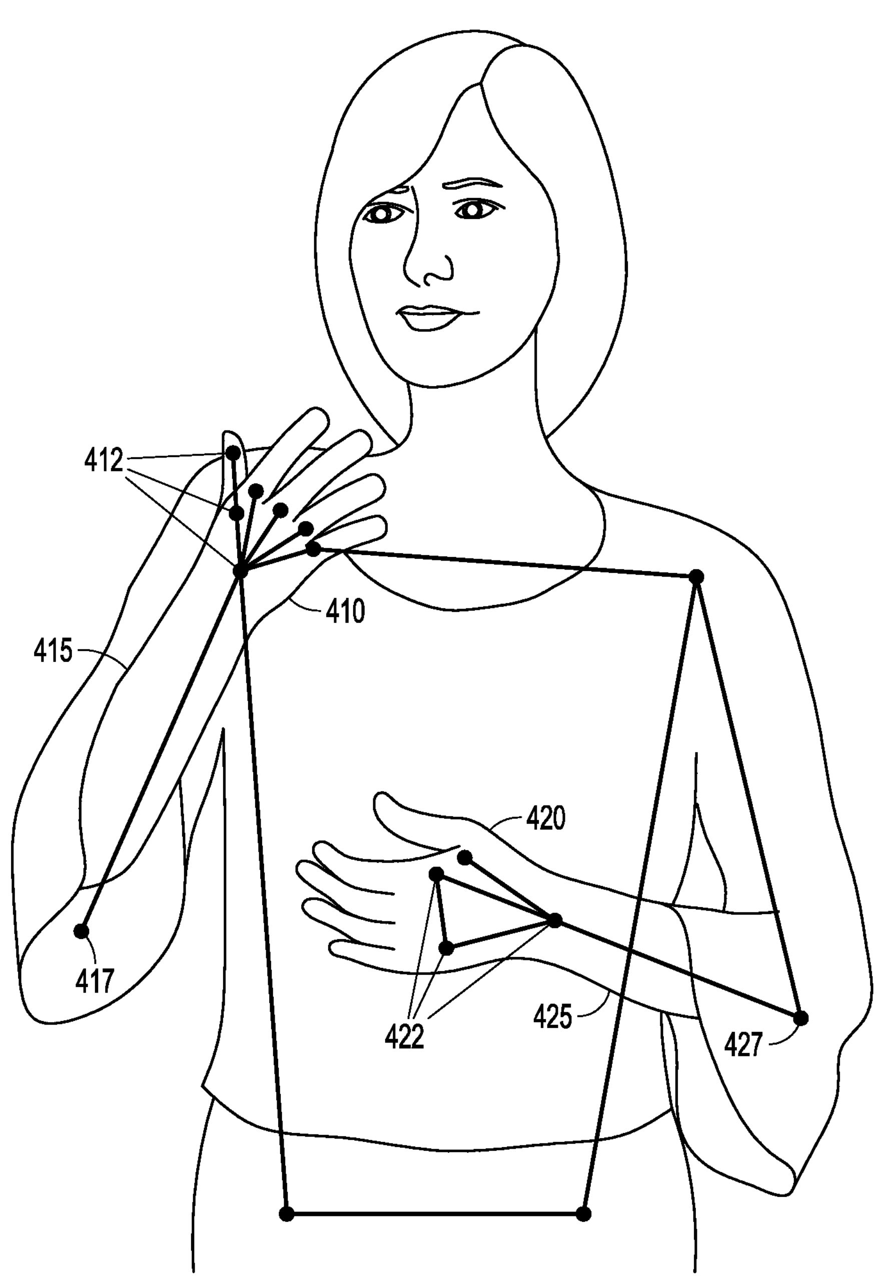
FIG. 4 illustrates an example of a calculation of an articulation point of a sign of a sign language.

The articulation point parameter or subunit specifies the area of the body where the person executes the sign. FIG. 4 illustrates an example of a calculation of an articulation point. In FIG. 4, the person's right hand 410 includes keypoints 412 and the right forearm 415 includes keypoint 417. The person's left hand 420 includes keypoints 422 and the person's left forearm 425 includes keypoint 427 at the left elbow. The area can be specific, as in the case of the right hand 412 where the right hand 412 contacts the person's right shoulder. The area can also be general (or neutral), as for example the left hand 420 that is near the person's abdomen but not touching the person's abdomen. Like with the handshape and the palm orientation, the articulation points are calculated using pose and hand coordinate keypoints provided by MediaPipe or similar software. The keypoints of the hand and arm positions are provided to a trained machine learning algorithm, and an articulation (e.g., the right hand touching the shoulder and the left hand near but not touching the abdomen) are provided by the trained machine learning algorithm.

Regarding the comparison metric, for each articulation point there is a reference value, for example: HEAD: 4, FACE: 3, MOUTH: 3, SIDE_HEAD: 2.5, O_SIDE_HEAD: 3.5, NECK: 2, BREAST: 1, O_BREAST: 1, BELLY: 1.5, NEUTRAL: 0. These example values were chosen so that more distant points are penalized. A function then calculates the distance between two articulation points. The function is abs (artpoint_1-artpoint_2). The output of this function is then used as one of the search parameters in the RALSpository database.

The movement parameter or subunit refers to the action performed by a person's hand during the execution of the sign. To classify a given movement, it is necessary to track each hand position during the entire input video and compare its trajectory to a list of known movements. The list of known movements is as follows:

| Parameter | Meaning |
|---|---|
| AM | Open Hand |
| ARC | Arc |
| F | Front |
| CF | Frontal Circular |
| CV | Vertical Circular |
| T | Back |
| D | Right |
| GA | Rotate Forearm |
| ED | Left-Right |
| MP | Move Wrist |
| DE | Left-Diagonal |
| CB | Top-Down |
| C | Top |
| B | Down |
| ESF | Rub |
| EXT | Extremity |
| AF | Open-Close |
| CT | Contact |
| SK | Shake |

For each known sign in the database, a mean curve, which is a normalized average of all the curves of that sign present in the database, is created. To compare a movement from a person to those in the database, a trajectory/curve of the person's sign is created by normalizing and interpolating the keypoints of the person's sign to a fixed amount of frames, and then a distance between the trajectory/curve of the person's sign and a trajectory/curve of a sign in the database is calculated by comparing with the mean curve of each sign in the database to the person's sign using dynamic time warping (DTW) and Euclidean distances to find the sign in the database with the smallest distance from the person's sign.

The next step can be referred to as a time warping matcher and includes a filter and aggregation step and a dynamic time warping step. Specifically, after feature extraction, which results in a frame-by-frame parametric description, a series of filters and aggregation functions are applied to clear the frames, and then a frame-aggregated DTW measures the similarity between two temporal sequences.

In the filter/aggregation step, the frame-by-frame representation is processed to create a summary of the main aspects of the parameters, thereby reducing the influence of transient errors such as wrong frame detection of keypoints or classification errors of the parameter classifier themselves. This is done by establishing the most frequent parameter for each of a sliding window. After this, the resulting parameters are grouped by occurrence in sequence. For example, suppose a sequence X of ten handshapes detections is X={A, A, A, C, C, C, B, C, C, A}. Using, window=3 and slide=1, the following illustrates three window passes.

Using, window=3 and slide=1, the following figures show three window passes.

$$\text{Pass 1: } X = \{\underline{A, A, A}, C, C, C, B, C, C, A\}$$

$$A$$

$$\text{Pass 2: } X = \{A, \underline{A, A, C}, C, C, B, C, C, A\}$$

$$A$$

$$\text{Pass 3: } X = \{A, A, \underline{A, C, C}, C, B, C, C, A\}$$

$$C$$

After all passes the resulting filter will be:

Y=Filter (X, window, slide)={A, A, C, C, C, C, C, C}

Then applying aggregation, as illustrated in the figure below:

Y={A, ~~A~~, C, ~~C, C, C, C~~}

Aggregation (Y)={A, C}. Each parameter has its own values for the window and slide.

The result of the previous filter and aggregation steps creates a condensed representation of the queried sign that can be compared to the known signs stored in the database. For this comparison, the DTW (dynamic time warping), which is an algorithm for measuring similarity between two temporal sequences, can be used. For measuring the similarity using the DTW, a weighted distance function can be defined for each parameter, and each parameter has its own weight(s).

Each parameter has its own way of calculating the distances between its instances. In the case of the palm orientation parameter, for example, two vectors are used to define the parameter and the distance function uses a different weight for each vector. The handshape parameter, in turn, uses one value to represent each handshape, thus requiring only one weight to calculate the distance between two instances.

With the junction of the output of the four parameters, the "Parametric Description" is formed, which represents computationally how a parameter of sign language is described. The "Parametric Description" consists of the following sequence of parameters: 1st Handshape, 2nd Palm Orientation, 3rd Articulation Point and 4th Movement.

As an output, the signal found in the database (RALSpository) that best approximates the "parametric description" constructed by the output of the four parameters based on the keypoints extracted from the video data is presented. The output of the process is the sign representation that best matches the recorded sign and its identifier.

The scalability of this system is twofold. There is scalability by composition since signs are compositions of parameters. It is possible to recognize any sign composed of any combination of instances of parameters that are covered by parameter recognition. There is also scalability by different languages since the phonological properties of the sign languages are very similar. It is therefore possible to recognize any sign of any language which shares the same instances of parameters covered by the system.

Figure 5:
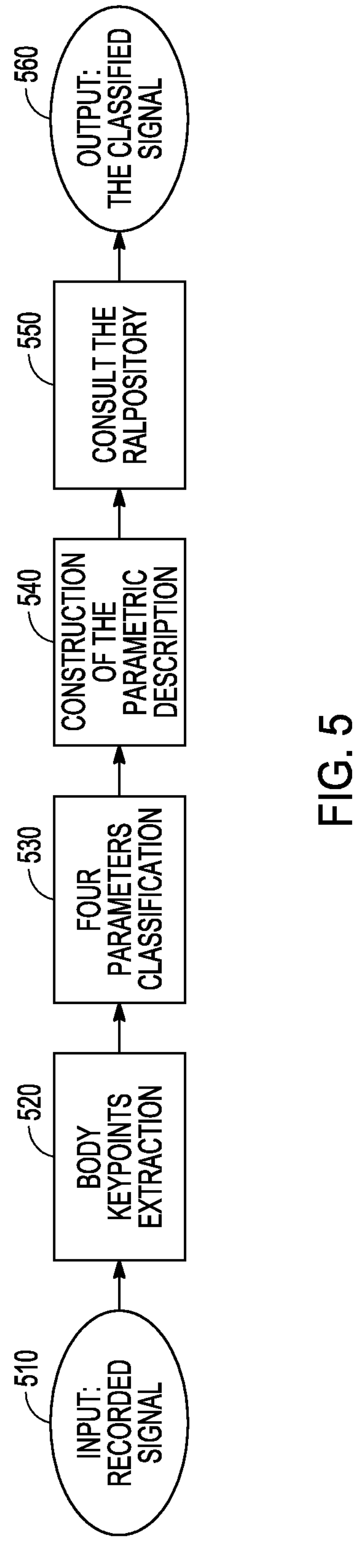
FIG. 5 is a high-level block diagram illustrating a process for recognizing signs in a sign language using keypoints.

FIG. 5 is a high-level block diagram illustrating a process for recognizing signs in a sign language using keypoints. At 510, an input signal is received. The input signal includes video data of a person executing a sign from a sign language. At 520, body keypoints are extracted from the video data. In an embodiment, software such as Google's MediaPoints can be used to extract the keypoints. At 530, the four parameters of handshape, palm orientation, articulation and movement are classified. The parametric description is constructed at 540, and this parametric description is compared to the database at 550. At 560, the classified hand signal is output.

Figure 6A:
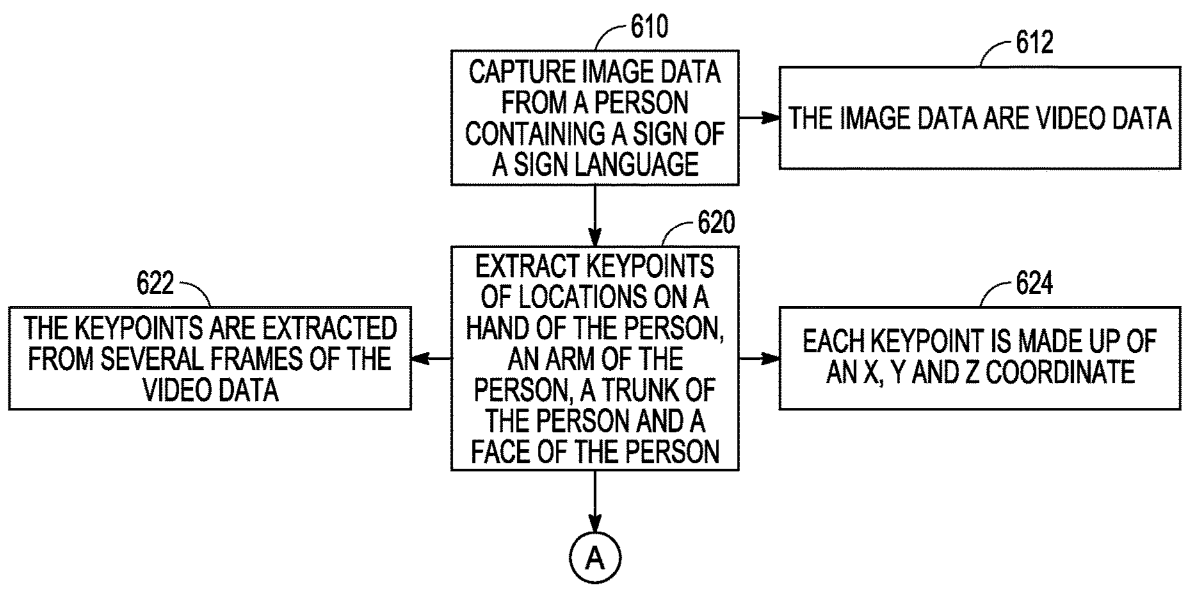
FIGS. 6A, 6B and 6C are a block diagram illustrating operations and features of a system to recognize signs in a sign language.
Figure 6B:
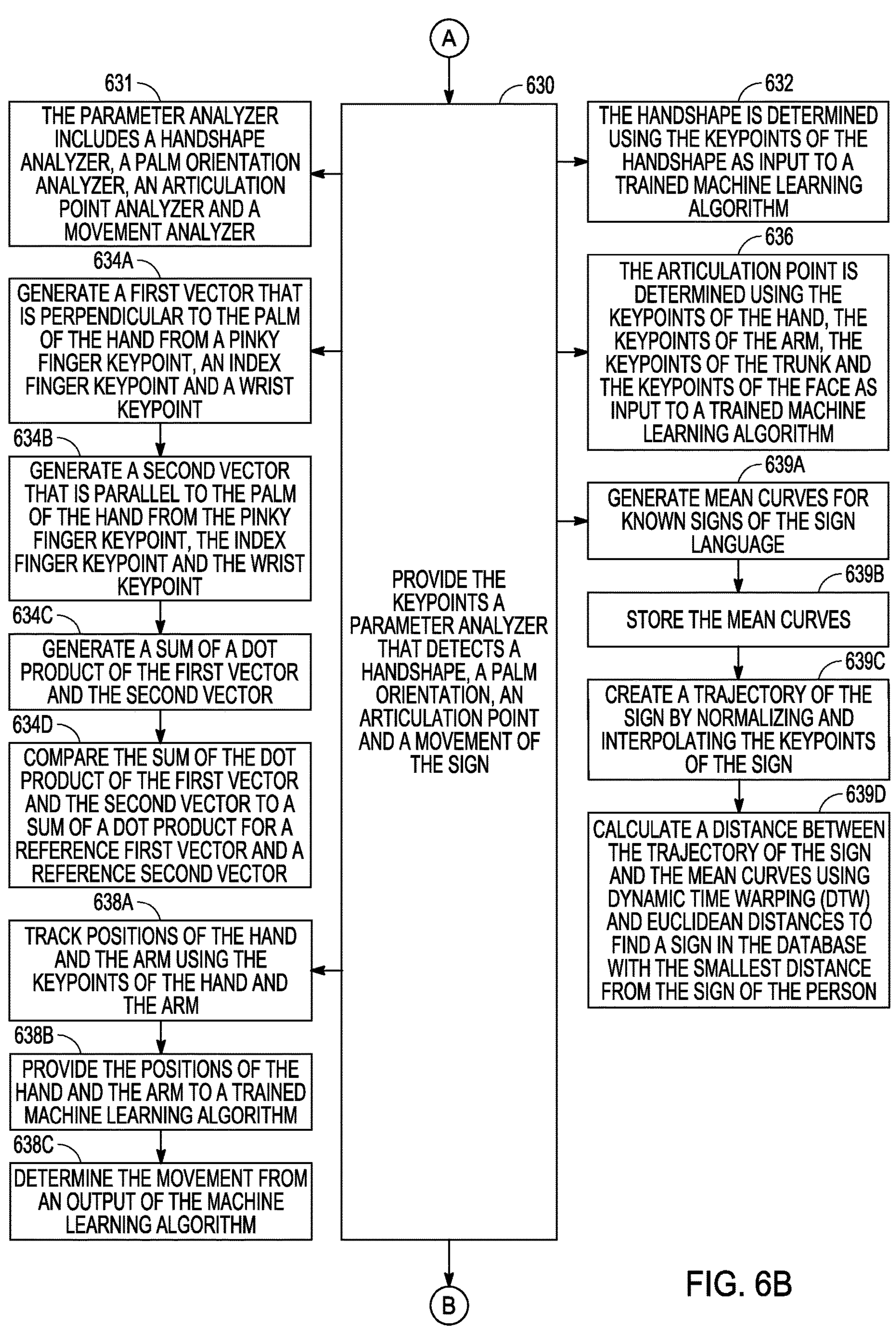
Figure 6C:
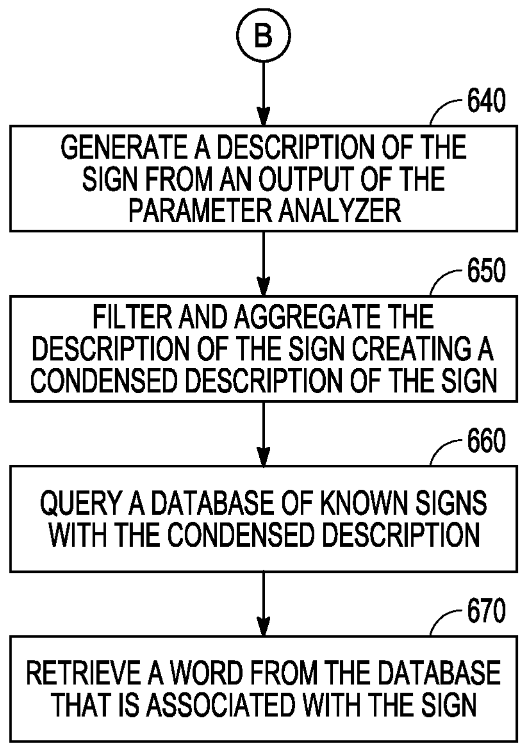

FIGS. 6A, 6B and 6C are a more detailed block diagram illustrating example embodiments of a system and process for recognizing signs in a sign language using keypoints. FIGS. 6A, 6B and 6C include a number of process and feature blocks 610-670. Though arranged substantially serially in the example of FIGS. 6A, 6B and 6C, other examples may reorder the blocks, omit one or more blocks, and/or execute two or more blocks in parallel using multiple processors or a single processor organized as two or more virtual machines or sub-processors.

Referring now specifically to FIGS. 6A, 6B and 6C, at 610, image data are captured by an image sensing device. The image data include a person executing a sign of a sign language. As indicated at 612, the image data can include video data.

At 620, keypoints are extracted from the image data. The keypoints include locations on a hand of the person, an arm of the person, a trunk of the person and a face of the person. As indicated at 622, the keypoints are extracted from a plurality of frames of the video data. Each keypoint is made up of an x, y and z coordinate in the image data (624).

At 630, the keypoints are provided to a parameter analyzer. The parameter analyzer detects characteristics of the sign. The characteristics of the sign include a handshape, a palm orientation, an articulation point and a movement. Consequently, the parameter analyzer includes a handshape analyzer, a palm orientation analyzer, an articulation point analyzer and a movement analyzer (631). The handshape is determined using the keypoints of the handshape as input to a trained machine learning algorithm (632). Similarly, the articulation point is determined using the keypoints of the hand, the keypoints of the arm, the keypoints of the trunk and the keypoints of the face as input to a trained machine learning algorithm (636).

The orientation of the palm is determined as follows. At 634A, a first vector that is perpendicular to the palm of the hand is generated from a pinky finger keypoint, an index finger keypoint and a wrist keypoint. At 634B, a second vector that is parallel to the palm of the hand is generated from the pinky finger keypoint, the index finger keypoint and the wrist keypoint. At 634C, a sum of a dot product of the first vector and the second vector is generated, and at 634D, the sum of the dot product of the first vector and the second vector is compared to a sum of a dot product for a reference first vector and a reference second vector.

The movement associated with the sign is determined as follows. Positions of the hand and the arm are tracked using the keypoints of the hand and the arm (638A). At 638B, the positions of the hand and the arm are provided to a trained machine learning algorithm, and at 638C, the movement is determined from an output of the machine learning algorithm. Additionally, at 639A, mean curves are generated for known signs of the sign language, and these mean curves are stored in a database at 639B. At 639C, a trajectory of the sign of the person is created by normalizing and interpolating the keypoints of the sign of the person. Then, at 639D, a distance between the trajectory of the sign of the person and the mean curves is calculated using dynamic time warping (DTW) and Euclidean distances to find a sign in the database with the smallest distance from the sign of the person.

At 640, a description of the sign is generated from an output of the parameter analyzer.

At 650, the description of the sign is filtered and aggregated. This creates a condensed description of the sign.

At 660, a database of known signs is queried with the condensed description. This query utilizes a dynamic time warping algorithm.

At 670, a communication is retrieved from the database that is associated with the sign. The communication can include a word, a phrase, a thought or an idea.

Figure 7:
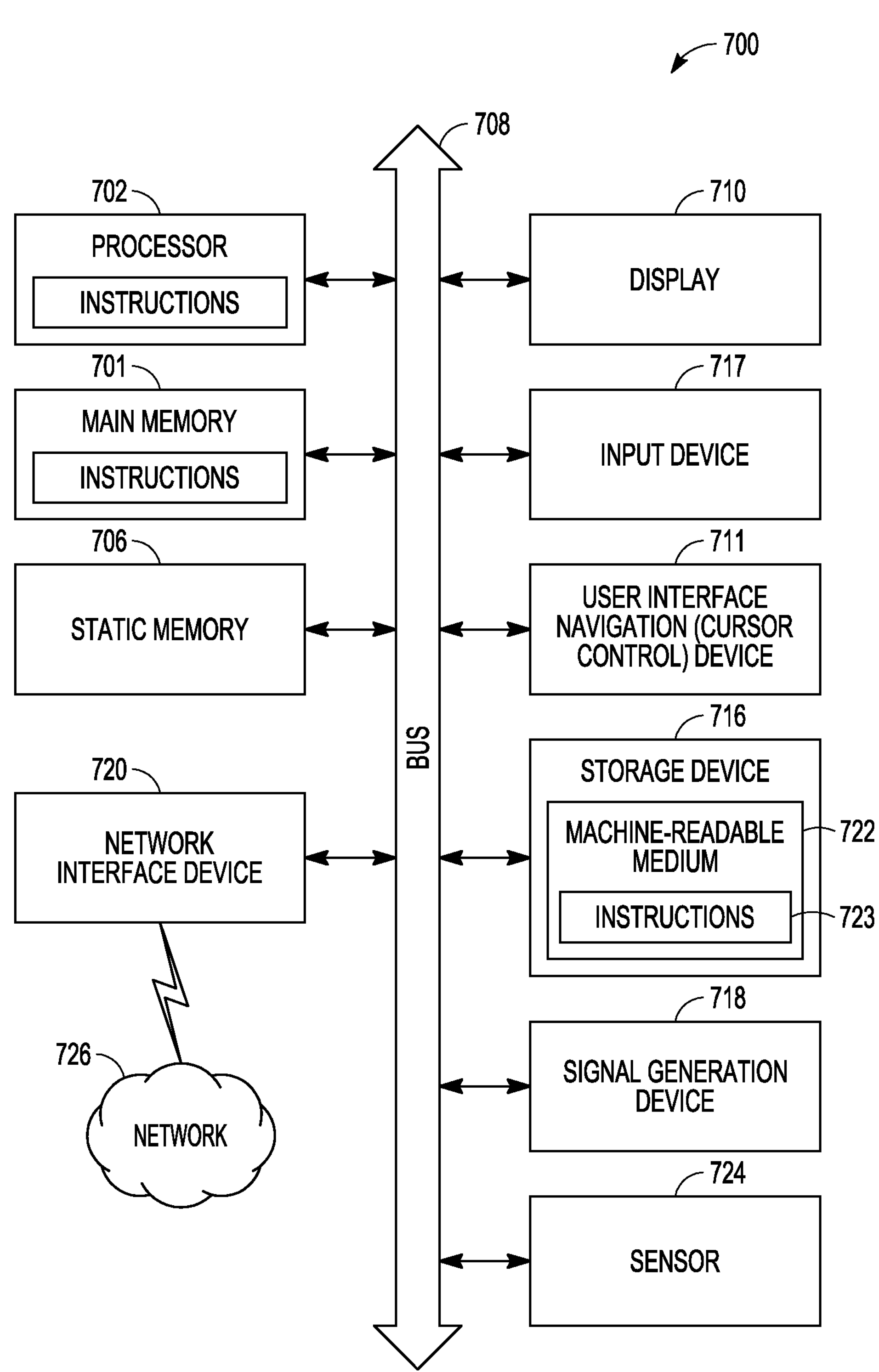
FIG. 7 is a block diagram of a computer architecture upon which one or more of the embodiments disclosed herein can execute.

FIG. 7 is a block diagram illustrating a computing and communications platform 700 in the example form of a general-purpose machine on which some or all the operations of FIGS. 6A, 6B and 6C may be carried out according to various embodiments. In certain embodiments, programming of the computing platform 700 according to one or more particular algorithms produces a special-purpose machine upon execution of that programming. In a networked deployment, the computing platform 700 may operate in the capacity of either a server or a client machine in server-client network environments, or it may act as a peer machine in peer-to-peer (or distributed) network environments.

Example computing platform 700 includes at least one processor 702 (e.g., a central processing unit (CPU), a graphics processing unit (GPU) or both, processor cores, compute nodes, etc.), a main memory 701 and a static memory 706, which communicate with each other via a link 708 (e.g., bus). The computing platform 700 may further include a video display unit 710, input devices 717 (e.g., a keyboard, camera, microphone), and a user interface (UI) navigation device 711 (e.g., mouse, touchscreen). The computing platform 700 may additionally include a storage device 716 (e.g., a drive unit), a signal generation device 718 (e.g., a speaker), a sensor 724, and a network interface device 720 coupled to a network 726.

The storage device 716 includes a non-transitory machine-readable medium 722 on which is stored one or more sets of data structures and instructions 723 (e.g., software) embodying or utilized by any one or more of the methodologies or functions described herein. The instructions 723 may also reside, completely or at least partially, within the main memory 701, static memory 706, and/or within the processor 702 during execution thereof by the computing platform 700, with the main memory 701, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 723. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process for receiving image data, the image data comprising a person executing a sign of a sign language; extracting a plurality of keypoints from the image data, wherein the keypoints comprise a plurality of locations on a hand of the person, an arm of the person, a trunk of the person and a face of the person; providing the plurality of keypoints to a parameter analyzer for detecting a plurality of characteristics of the sign, wherein the plurality of characteristics of the sign comprises a handshape, a palm orientation, an articulation point and a movement; generating from an output of the parameter analyzer a description of the sign; filtering and aggregating the description of the sign, thereby creating a condensed description of the sign; querying a database of known signs with the condensed description using a dynamic time warping algorithm; and retrieving from the database a word that is associated with the sign.

Example No. 2 includes all the features of Example No. 1, and optionally includes a process wherein the image data comprise video data; and wherein the plurality of keypoints is extracted from a plurality of frames of the video data.

Example No. 3 includes all the features of Example Nos. 1-2, and optionally includes a process including determining the handshape using the plurality of keypoints of the handshape in the image data as input to a trained machine learning algorithm.

Example No. 4 includes all the features of Example Nos. 1-3, and optionally includes a process including determining the palm orientation in the image data by generating, from a pinky finger keypoint, an index finger keypoint and a wrist keypoint, a first vector perpendicular to a palm of the hand; generating, from the pinky finger keypoint, the index finger keypoint and the wrist keypoint, a second vector parallel to the palm of the hand; generating a sum of a dot product of the first vector and the second vector; and comparing the sum of the dot product of the first vector and the second vector to a sum of a dot product for a reference first vector and a reference second vector.

Example No. 5 includes all the features of Example Nos. 1-4, and optionally includes a process including determining the articulation point using the keypoints of the hand, the keypoints of the arm, the keypoints of the trunk and the keypoints of the face as input to a trained machine learning algorithm.

Example No. 6 includes all the features of Example Nos. 1-5, and optionally includes a process wherein a determination of the movement includes tracking a plurality of positions of the hand and the arm using the keypoints of the hand and the arm; providing the plurality of positions of the hand and the arm to a trained machine learning algorithm; and determining the movement from an output of the machine learning algorithm.

Example No. 7 includes all the features of Example Nos. 1-6, and optionally includes a process including generating mean curves for a plurality of known signs of the sign language; storing the mean curves in the database; creating a trajectory of the sign of the person by normalizing and interpolating the keypoints of the sign of the person; and calculating a distance between the trajectory of the sign of the person and the mean curves using Dynamic Time Warping (DTW) and Euclidean distances to find a sign in the database with the smallest distance from the sign of the person.

Example No. 8 includes all the features of Example Nos. 1-7, and optionally includes a process wherein the parameter analyzer comprises one or more of a handshape analyzer, a palm orientation analyzer, an articulation point analyzer and a movement analyzer.

Example No. 9 includes all the features of Example Nos. 1-8, and optionally includes a process wherein each keypoint comprises an x, y and z coordinate in the image data.

Example No. 10 is a machine-readable medium having instructions that when executed by a processor executes a process including receiving image data, the image data comprising a person executing a sign of a sign language; extracting a plurality of keypoints from the image data, wherein the keypoints comprise a plurality of locations on a hand of the person, an arm of the person, a trunk of the person and a face of the person; providing the plurality of keypoints to a parameter analyzer for detecting a plurality of characteristics of the sign, wherein the plurality of characteristics of the sign comprises a handshape, a palm orientation, an articulation point and a movement; generating from an output of the parameter analyzer a description of the sign; filtering and aggregating the description of the sign, thereby creating a condensed description of the sign; querying a database of known signs with the condensed description using a dynamic time warping algorithm; and retrieving from the database a word that is associated with the sign.

Example No. 11 includes all the features of Example No. 10, and optionally includes a machine-readable medium wherein the image data comprise video data; and wherein the plurality of keypoints is extracted from a plurality of frames of the video data.

Example No. 12 includes all the features of Example Nos. 10-11, and optionally includes a machine-readable medium including instructions for determining the handshape using the plurality of keypoints of the handshape in the image data as input to a trained machine learning algorithm.

Example No. 13 includes all the features of Example Nos. 10-12, and optionally includes a machine-readable medium including instructions for determining the palm orientation in the image data by generating, from a pinky finger keypoint, an index finger keypoint and a wrist keypoint, a first vector perpendicular to a palm of the hand; generating, from the pinky finger keypoint, the index finger keypoint and the wrist keypoint, a second vector parallel to the palm of the hand; generating a sum of a dot product of the first vector and the second vector; and comparing the sum of the dot product of the first vector and the second vector to a sum of a dot product for a reference first vector and a reference second vector.

Example No. 14 includes all the features of Example Nos. 10-13, and optionally includes a machine-readable medium including instructions for determining the articulation point using the keypoints of the hand, the keypoints of the arm, the keypoints of the trunk and the keypoints of the face as input to a trained machine learning algorithm.

Example No. 15 includes all the features of Example Nos. 10-14, and optionally includes a machine-readable medium wherein a determination of the movement includes instructions for tracking a plurality of positions of the hand and the arm using the keypoints of the hand and the arm; providing the plurality of positions of the hand and the arm to a trained machine learning algorithm; and determining the movement from an output of the machine learning algorithm.

Example No. 16 includes all the features of Example Nos. 10-15, and optionally includes a machine-readable medium including instructions for generating mean curves for a plurality of known signs of the sign language; storing the mean curves in the database; creating a trajectory of the sign of the person by normalizing and interpolating the keypoints of the sign of the person; and calculating a distance between the trajectory of the sign of the person and the mean curves using Dynamic Time Warping (DTW) and Euclidean distances to find a sign in the database with the smallest distance from the sign of the person.

Example No. 17 includes all the features of Example Nos. 10-16, and optionally includes a machine-readable medium wherein the parameter analyzer comprises one or more of a handshape analyzer, a palm orientation analyzer, an articulation point analyzer and a movement analyzer.

Example No. 18 includes all the features of Example Nos. 10-17, and optionally includes a machine-readable medium wherein each keypoint comprises an x, y and z coordinate in the image data.

Example No. 19 is a system including a processor; and a memory coupled to the processor; wherein the processor and memory are operable for receiving image data, the image data comprising a person executing a sign of a sign language; extracting a plurality of keypoints from the image data, wherein the keypoints comprise a plurality of locations on a hand of the person, an arm of the person, a trunk of the person and a face of the person; providing the plurality of keypoints to a parameter analyzer for detecting a plurality of characteristics of the sign, wherein the plurality of characteristics of the sign comprises a handshape, a palm orientation, an articulation point and a movement; generating from an output of the parameter analyzer a description of the sign; filtering and aggregating the description of the sign, thereby creating a condensed description of the sign; querying a database of known signs with the condensed description using a dynamic time warping algorithm; and retrieving from the database a word that is associated with the sign.

Example No. 20 includes all the features of Example No. 19, and optionally includes a system wherein the processor and memory are operable for determining the handshape using the plurality of keypoints of the handshape in the image data as input to a trained machine learning algorithm.

The invention claimed is:

1. A computerized process comprising:

receiving image data, the image data comprising a person executing a sign of a sign language;

extracting a plurality of keypoints from the image data, wherein the keypoints comprise a plurality of locations on a hand of the person, an arm of the person, a trunk of the person and a face of the person;

providing the plurality of keypoints to a parameter analyzer for detecting a plurality of characteristics of the sign, wherein the plurality of characteristics of the sign comprises a handshape, a palm orientation, an articulation point and a movement;

generating from an output of the parameter analyzer a description of the sign;

filtering and aggregating the description of the sign, thereby creating a condensed description of the sign;

querying a database of known signs with the condensed description using a dynamic time warping algorithm; and retrieving from the database a communication that is associated with the sign;

wherein the parameter analyzer for determining the palm orientation in the image data comprises:

generating, from a pinky finger keypoint, an index finger keypoint and a wrist keypoint, a first vector perpendicular to a palm of the hand;

generating, from the pinky finger keypoint, the index finger keypoint and the wrist keypoint, a second vector parallel to the palm of the hand;

generating a sum of a dot product of the first vector and the second vector; and comparing the sum of the dot product of the first vector and the second vector to a sum of a dot product for a reference first vector and a reference second vector.

2. The computerized process of claim 1, wherein the image data comprise video data; and wherein the plurality of keypoints is extracted from a plurality of frames of the video data.

3. The computerized process of claim 1, wherein the parameter analyzer for determining the handshape uses the plurality of keypoints of the handshape in the image data as input to a trained machine learning algorithm.

4. The computerized process of claim 1, wherein the parameter analyzer for determining the articulation point uses the keypoints of the hand, the keypoints of the arm, the keypoints of the trunk and the keypoints of the face as input to a trained machine learning algorithm.

5. The computerized process of claim 1, wherein the parameter analyzer for determining the movement comprises:

tracking a plurality of positions of the hand and the arm using the keypoints of the hand and the arm;

providing the plurality of positions of the hand and the arm to a trained machine learning algorithm; and determining the movement from an output of the machine learning algorithm.

6. The computerized process of claim 5, comprising:

generating mean curves for a plurality of known signs of the sign language;

storing the mean curves in the database;

creating a trajectory of the sign of the person by normalizing and interpolating the keypoints of the sign of the person; and calculating a distance between the trajectory of the sign of the person and the mean curves using Dynamic Time Warping (DTW) and Euclidean distances to find a sign in the database with the smallest distance from the sign of the person.

7. The computerized process of claim 1, wherein the parameter analyzer comprises one or more of a handshape analyzer, a palm orientation analyzer, an articulation point analyzer and a movement analyzer.

8. The computerized process of claim 1, wherein each keypoint comprises an x, y and z coordinate in the image data.

9. A non-transitory machine-readable medium comprising instructions that when executed by a processor executes a process comprising:

receiving image data, the image data comprising a person executing a sign of a sign language;

extracting a plurality of keypoints from the image data, wherein the keypoints comprise a plurality of locations on a hand of the person, an arm of the person, a trunk of the person and a face of the person;

providing the plurality of keypoints to a parameter analyzer for detecting a plurality of characteristics of the sign, wherein the plurality of characteristics of the sign comprises a handshape, a palm orientation, an articulation point and a movement;

generating from an output of the parameter analyzer a description of the sign;

filtering and aggregating the description of the sign, thereby creating a condensed description of the sign;

querying a database of known signs with the condensed description using a dynamic time warping algorithm; and retrieving from the database a communication that is associated with the sign;

wherein the parameter analyzer comprises instructions for determining the articulation point using the keypoints of the hand, the keypoints of the arm, the keypoints of the trunk and the keypoints of the face as input to a trained machine learning algorithm.

10. The non-transitory machine-readable medium of claim 9, wherein the image data comprise video data; and wherein the plurality of keypoints is extracted from a plurality of frames of the video data.

11. The non-transitory machine-readable medium of claim 9, wherein the parameter analyzer comprises instructions for determining the handshape using the plurality of keypoints of the handshape in the image data as input to a trained machine learning algorithm.

12. The non-transitory machine-readable medium of claim 9, wherein the parameter analyzer comprises instructions for determining the palm orientation in the image data by:

generating, from a pinky finger keypoint, an index finger keypoint and a wrist keypoint, a first vector perpendicular to a palm of the hand;

generating, from the pinky finger keypoint, the index finger keypoint and the wrist keypoint, a second vector parallel to the palm of the hand;

generating a sum of a dot product of the first vector and the second vector; and comparing the sum of the dot product of the first vector and the second vector to a sum of a dot product for a reference first vector and a reference second vector.

13. The non-transitory machine-readable medium of claim 9, wherein the parameter analyzer comprises instructions for determining the movement by:

tracking a plurality of positions of the hand and the arm using the keypoints of the hand and the arm;

providing the plurality of positions of the band and the arm to a trained machine learning algorithm; and determining the movement from an output of the machine learning algorithm.

14. The non-transitory machine-readable medium of claim 13, comprising instructions for:

generating mean curves for a plurality of known signs of the sign language;

storing the mean curves in the database;

creating a trajectory of the sign of the person by normalizing and interpolating the keypoints of the sign of the person; and calculating a distance between the trajectory of the sign of the person and the mean curves using Dynamic Time Warping (DTW) and Euclidean distances to find a sign in the database with the smallest distance from the sign of the person.

15. The non-transitory machine-readable medium of claim 9, wherein the parameter analyzer comprises one or more of a handshape analyzer, a palm orientation analyzer, an articulation point analyzer and a movement analyzer.

16. The non-transitory machine-readable medium of claim 9, wherein each keypoint comprises an x, y and z coordinate in the image data.

17. A system comprising:

a processor; and a memory coupled to the processor;

wherein the processor and memory are operable for:

receiving image data, the image data comprising a person executing a sign of a sign language;

extracting a plurality of keypoints from the image data, wherein the keypoints comprise a plurality of locations on a hand of the person, an arm of the person, a trunk of the person and a face of the person;

providing the plurality of keypoints to a parameter analyzer for detecting a plurality of characteristics of the sign, wherein the plurality of characteristics of the sign comprises a handshape, a palm orientation, an articulation point and a movement;

generating from an output of the parameter analyzer a description of the sign;

filtering and aggregating the description of the sign, thereby creating a condensed description of the sign;

querying a database of known signs with the condensed description using a dynamic time warping algorithm; and retrieving from the database a communication that is associated with the sign;

wherein the parameter analyzer for determining the palm orientation in the image data comprises:

generating, from a pinky finger keypoint, an index finger keypoint and a wrist keypoint, a first vector perpendicular to a palm of the hand;

generating, from the pinky finger keypoint, the index finger keypoint and the wrist keypoint, a second vector parallel to the palm of the hand;

generating a sum of a dot product of the first vector and the second vector; and comparing the sum of the dot product of the first vector and the second vector to a sum of a dot product for a reference first vector and a reference second vector.

18. The system of claim 17, wherein the parameter analyzer determines the handshape using the plurality of keypoints of the handshape in the image data as input to a trained machine learning algorithm.

* * * * *